(12) United States Patent
Anderson et al.

(10) Patent No.: US 9,089,772 B2
(45) Date of Patent: Jul. 28, 2015

(54) METHODS AND SYSTEMS FOR ESTABLISHING GAMES WITH AUTOMATION USING VERBAL COMMUNICATION

(75) Inventors: Dave Anderson, Lawrenceville, GA (US); Senis Busayapongchai, Tucker, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1321 days.

(21) Appl. No.: 11/949,309

(22) Filed: Dec. 3, 2007

(65) Prior Publication Data

US 2008/0076557 A1  Mar. 27, 2008

Related U.S. Application Data

(63) Continuation of application No. 10/603,724, filed on Jun. 24, 2003, now Pat. No. 7,303,474.

(51) Int. Cl.

| | |
|---|---|
| A63F 9/24 | (2006.01) |
| A63F 13/00 | (2014.01) |
| G06F 19/00 | (2011.01) |
| G06F 17/00 | (2006.01) |
| G10L 17/00 | (2013.01) |
| A63F 13/30 | (2014.01) |

(52) U.S. Cl.
CPC ......... *A63F 13/12* (2013.01); *A63F 2300/1081* (2013.01); *A63F 2300/50* (2013.01); *A63F 2300/6072* (2013.01); *A63F 2300/6081* (2013.01)

(58) Field of Classification Search
CPC ................................................ A63F 2300/531

USPC .............................. 709/229; 463/39; 704/246
See application file for complete search history.

(56) References Cited

U.S. PATENT DOCUMENTS

| | | |
|---|---|---|
| 4,445,187 A | 4/1984 | Best |
| 5,393,073 A | 2/1995 | Best |
| 6,458,033 B1 | 10/2002 | Shoji |
| 6,554,707 B1 | 4/2003 | Sinclair et al. |
| 6,676,523 B1 | 1/2004 | Kasai et al. |
| 6,928,329 B1 | 8/2005 | Giaimo et al. |

(Continued)

OTHER PUBLICATIONS

Game Commander 2 User Guide, copyright 2001.*

(Continued)

*Primary Examiner* — Kang Hu
*Assistant Examiner* — Syvila Weatherford

(57) ABSTRACT

Methods and systems establish games with automation using verbal communication for exchanges between the automated game and the one or more game players. Game information data is converted into verbal information that is provided to the individual. The individual provides verbal instruction which is received and converted into the instruction data. The instruction data is applied to the current game to update the current game status. Information data for the current game status is converted to verbal information for the current game status which is provided to the individual. The game may be implemented on a local device of the individual or may be network-based and accessed remotely by the individual through verbal communication over a voice connection. The voice connection may be of various forms such as a conventional voiced call to a voice services node of a telephone network or a voice-over IP voiced call on a data network.

11 Claims, 4 Drawing Sheets

(56) References Cited

U.S. PATENT DOCUMENTS

| | | | |
|---|---|---|---|
| 2001/0006909 A1 | 7/2001 | Mirasaki et al. | |
| 2003/0033145 A1* | 2/2003 | Petrushin | 704/236 |
| 2003/0054879 A1* | 3/2003 | Schneier et al. | 463/29 |
| 2003/0078784 A1* | 4/2003 | Jordan et al. | 704/275 |
| 2003/0171147 A1 | 9/2003 | Sinclair et al. | |
| 2004/0255032 A1* | 12/2004 | Danieli | 709/229 |

OTHER PUBLICATIONS

U.S. Appl. No. 10/610,266, entitled "Automated Methods and Systems For Assisting Customers in Making Purchases Utilizing Verbal Communication," filed Jun. 30, 2003; Inventor: Scott Stillman.

U.S. Appl. No. 10/603,403, entitled "Method and Systems for Assisting in Real Estate Transactions With Automation Utilizing Verbal Communication,:" filed Jun. 24, 2003, Inventors: David Anderson; Senis Busayapongchai.

U.S. Appl. No. 10/603,448, entitled "Methods and Systems for Assisting Scheduling With Automation," filed Jun. 24, 2003, Inventors: David Anderson; Robert A. Koch.

U.S. Appl. No. 10/610,045, entitled "Methods and Systems for Obtaining Profile Information From Individuals Using Automation," filed Jun. 30, 2003, Inventors: Scott Stillman.

"i3 Mobile & Nuance," *ASRNews—Automatic Speech Recognition*, vol. 13, No. 8, Aug. 2002, Contact: Gwen Murphy.

"RezConnect," *ASRNews—Automatic Speech Recognition*, vol. 11, No. 2, Feb. 2000, Contact: Michael Brent.

"EbizPortals Bring Shopping to netECHO," *ASRNews—Automatic Speech Recognition*, vol. 12, No. 3, Mar. 2001, Contact: Dr. Emdad Khan.

"ViaFone & Ticketmaster," *ASRNews—Automatic Speech Recognition*, vol. 11, No. 7, Jul. 2000, Contact: Emily Cohen.

"CommWorks Enhances UC," *ASRNews—Automatic Speech Recognition*, vol. 13, No. 4, Apr. 2002, Contact: Steven M. Ostrowski; John Leikness.

"Fandango Provides Movie Tickets," *ASRNews—Automatic Speech Recognition*, vol. 13, No. 1, Jan. 2002, Contact: Sallie Green, Fandango.

Game Commander 2 (http://www.gamecommander.com) (2000).

Microsoft Sidewinder Game Voice (Aug. 24, 2000) (http://ww.Microsoft.com/presspass/features/200/aug00/08-24gamevoice.mspx).

Distributed Speech Recognition (2002) (http://web.archive.org/web(2002067125522/http://ww.telecom.tuc.gr/~perak/speech).

Game Commander 2 User's Guide (www.gamecommander.com).

* cited by examiner

METHODS AND SYSTEMS FOR ESTABLISHING GAMES WITH AUTOMATION USING VERBAL COMMUNICATION

RELATED APPLICATION

This is a continuation of application Ser. No. 10/603,724 filed Jun. 24, 2003 and issuing as U.S. Pat. No. 7,303,474, which is incorporated herein by reference.

TECHNICAL FIELD

The present invention is related to automated games. More particularly, the present invention is related to automated games where verbal communication occurs between the game and the game player.

BACKGROUND

Individuals enjoy playing a variety of games such as handheld electronic games, board games, and on-line computer games. However, there are many inconveniences of life and of such games that may limit an individual's enjoyment. Individuals are more mobile yet time strapped than ever before so that individuals have less time to participate in such games. Furthermore, individuals may lose interest in games after they have been played for a period of time because the game becomes stale to the individual. Furthermore, individuals may wish to play multi-player games such as board games when other individuals are not present to also participate. Additionally, individuals are often in situations where they wish to play games at inopportune times, such as when caught in traffic where they cannot interact with a display and a controller of a typical handheld game.

SUMMARY

Embodiments of the present invention address these issues and others by providing methods and systems that provide automated gaming that uses verbal communication between one or more game players and the automated game. The automated game may be implemented at a local device of the game player that provides verbal exchange with the game player or from a network-based platform that the game player accesses remotely and communicates with verbally.

One embodiment is a method of providing gaming with automation using verbal communication. The method involves providing verbal information of a current game status to a game player from a voice synthesis device. Verbal instruction is received from the game player at the voice synthesis device in response to providing the verbal information. The verbal instruction from the game player is applied to update the current game status. Verbal information of the updated current game status is provided to the game player from the voice synthesis device.

Another embodiment is a system for providing gaming with automation using verbal communication. A personal voice synthesis device of a game player provides verbal information of a current game status directly to the game player, receives verbal instruction directly from the game player in response to providing the verbal information, converts the verbal instruction to instruction data, and provides verbal information of an updated game status to the game player. A first computer-implemented application portion is performed by the personal voice synthesis device and applies the instruction data to update the current game status and generates a request for updates of game data. A second network-based computer-implemented application portion is performed remotely from the voice synthesis device, receives the request for updates of game data, and provides the updates of game data to the first computer-implemented application portion.

Another embodiment is a system for providing gaming with automation using verbal communication. A voice synthesis system receives and converts information data to verbal information and provides the verbal information of a current game status directly to the game player, receives verbal instruction directly from the game player in response to providing the verbal information, converts the verbal instruction to instruction data, and provides the instruction data. A network-based computer-implemented application provides the information data to the voice synthesis system, receives the instruction data from the voice synthesis system, and applies the instruction data to update a current game status. The information data comprises data specifying the update to the current game status.

Another embodiment is a system for providing gaming with automation using verbal communication. A voice services node receives information data, converts the information data to verbal information and provides the verbal information of a current game status over a voiced call with the game player, receives verbal instruction from the game player over the voiced call in response to providing the verbal information, converts the verbal instruction to instruction data, and provides the instruction data. A network-based computer-implemented application provides information data to the voice services node, receives the instruction data and applies the instruction data to update a current game status. The information data comprises data specifying the update to the current game status.

DETAILED DESCRIPTION

Embodiments of the present invention provide various configurations of a game that provides verbal interaction with the game player. For example, a thick-game client device may implement the game and the verbal interaction with the game player. As another example, a thin-game client device working in conjunction with a network-based service may implement the game and the verbal interaction with the game player. As another example, an entirely network-based service may implement the game and the verbal interaction with the game player. The automated gaming allows the individual to participate in the game, which may be either a single player or multi-player game, by verbally communicating to the game. Verbal communication is provided from the game back to the individual, and visual information may be provided as well such as where the game player accesses the automated game through a device supporting visual displays. Accordingly, the game may be played by using the thick-game client device or by accessing the network based game with a telephone or a thin-game client device.

Figure 1:
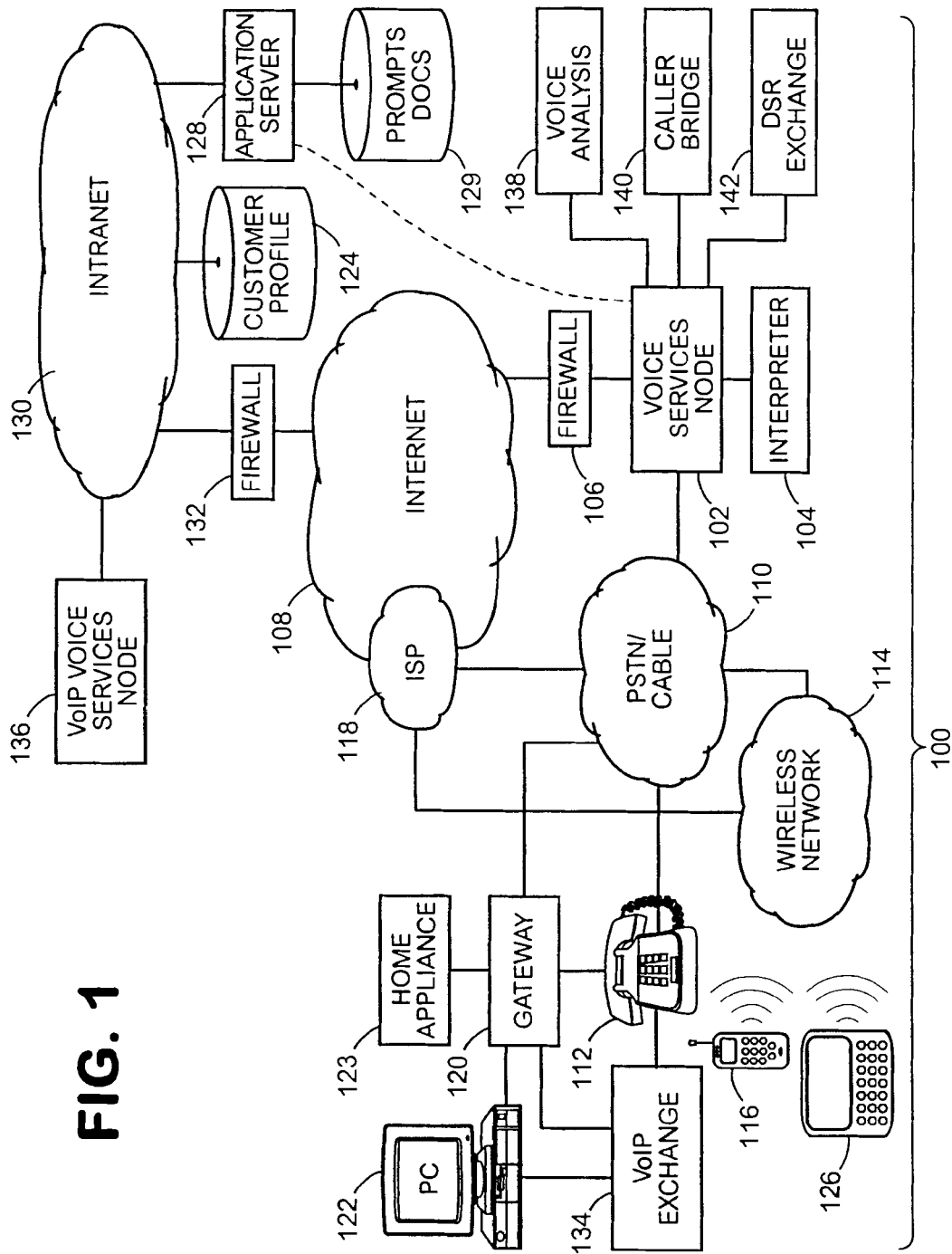
FIG. 1 shows one illustrative embodiment of a system for establishing games with game players using verbal communication exchanges between the game and game player.

FIG. 1 illustrates one example of an encompassing communications network 100 interconnecting verbal communications devices of the game player with the network-based system that automates the game play and/or that provide game updates to a thick-game client device. The game player may access the network-based system through several different channels of verbal communication. As discussed below, the customer communicates verbally with a voice synthesis device, such as a thick-game client device that may also be a thick-voice or thin-voice client device, a thin-game client device that may also be a thick-voice or thin-voice client device, and/or a voice services node that may be present in one of several locations of the different embodiments.

A thick-game client device includes all of the game data processing on-board while a thin-game client device includes only a small portion of game data processing such as to render visual displays while the majority of the game data processing is network based. A thick-voice client devices includes all of the voice processing on-board while a thin-voice client device includes only a small portion of the voice processing such as to generate acoustic parameter data discussed below while the remainder of the voice processing occurs at a voice services node. It will be appreciated that a client device may be thick with respect to both game processing and voice processing, may be thick with respect to one type of processing and thin with respect to the other, or may be thin with respect to both types of processing.

As one example of the various ways in which a game player may access the automated gaming service, the game player may place a conventional voiced call from a telephone 112 through a network 110 for carrying conventional telephone calls such as a public switched telephone network ("PSTN") or an adapted cable television network. The call terminates at a terminating voice services node 102 of the PSTN/cable network 110 according to the number dialed by the customer. This voice services node 102 is a common terminating point within an advanced intelligent network ("AIN") of modern PSTNs and adapted cable networks and is typically implemented as a soft switch and media server combination.

Another example of accessing the system is by the game player placing a voiced call from a wireless phone 116. The wireless phone 116 maintains a wireless connection to a wireless network 114 that includes base stations and switching centers as well as a gateway to the PSTN/cable network 110. The PSTN/cable network 110 then directs the call from the wireless phone 116 to the voice services node 102 according to the number or code dialed by the game player on the wireless phone 116. Furthermore, the wireless phone 116 or a personal data device 126 such as a personal digital assistant may function as a thin-voice client device (which as discussed above may also be a thin-game client device but not necessarily) relative to the verbal functions of the automated gaming system such that the thin-voice client device implements a distributed speech recognition ("DSR") platform to minimize the information transmitted through the wireless connection. The DSR platform takes the verbal communication received from the customer at the thin-voice client device and generates parameterization data from the verbal communication. The DSR platform then transmits the parameterization data as the verbal communication to the voice service node 102 or 136 rather than all the data representing the verbal communications. The voice services node 102 or 136 then utilizes a DSR exchange function 142 to translate the DSR parameterization data into representative text which the voice services node 102 or 136 can deliver to an application server 128.

Another example of accessing the system is by the game player placing a voiced call from a voice-over-IP ("VoIP") based device such as a personal computer 122 or where telephone 112 is a VoIP phone. This VoIP call from the game player may be to a local VoIP exchange 134 which converts the VoIP communications from the customer's device into conventional telephone signals that are passed to the PSTN/cable network 110 and on to the voice services node 102. The VoIP exchange 134 converts the conventional telephone signals from the PSTN/cable network 110 to VoIP packet data that is then distributed to the telephone 112 or computer 122 where it becomes verbal information to the customer. Furthermore, the wireless phone 116 may be VoIP capable such that communications with the wireless data network 114 occur over VoIP and are converted to speech prior to delivery to the voice services node 102.

The VoIP call from the customer may alternatively be through an Internet gateway 120 of the customer, such as a broadband connection or wireless data network 114, to an Internet Service Provider ("ISP") 118. The ISP 118 interconnects the gateway 120 of the customer or wireless network 114 to the Internet 108 which then directs the VoIP call according to the number dialed, which signifies an Internet address of a voice services node 136 of an intranet 130 from which the gaming service is provided. This intranet 130 is typically protected from the Internet 108 by a firewall 132. The voice service node 136 includes a VoIP interface and is typically implemented as a media gateway and server which performs the VoIP-voice conversion such as that performed by the VoIP exchange 134 but also performs text-to-speech, speech recognition, and natural language understanding such as that performed by the voice services node 102 and discussed below. Accordingly, the discussion of the functions of the voice services node 102 also applies to the functions of the voice service node 136.

As yet another example, the wireless device 116, personal digital assistant 126, and/or personal computer 122 may have a wi-fi wireless data connection to the gateway 120 or directly to the wireless network 114 such that the verbal communication received from the customer is encoded in data communications between the wi-fi device of the customer and the gateway 120 or wireless network 114.

Another example of accessing a voice services node 102 or 136 is through verbal interaction with an interactive home appliance 123. Such interactive home appliances may maintain connections to a local network of the customer as provided through a gateway 120 and may have access to outbound networks, including the PSTN/cable network 110 and/or the Internet 108. Thus, the verbal communication may be received at the home appliance 123 and then channel via VoIP through the Internet 108 to the voice services node 136 or may be channeled via the PSTN/cable network 110 to the voice services node 102.

Yet another example provides for the voice services node to be implemented in the gateway 120 or other local device of the customer so that the voice call with the customer is directly with the voice services node within the customer's local network rather than passing through the Internet 108 or PSTN/cable network 110. The data created by the voice services node from the verbal communication from the customer is then passed through the communications network 100, such as via a broadband connection through the PSTN/cable network 110 and to the ISP 118 and Internet 108 and then on to the application server 128. Likewise, the data representing the verbal communication to be provided to the customer is provided over the communications network 100 back to the voice services node within the customer's local network where it is then converted into verbal communication provided to the customer.

Where the game player places a voiced call to the network-based service through a voice services node, such as when using a telephone to place the call for an entirely network based implementation of the game or when contacting the voice services node through a thin-voice client, the voice services node provides the text-to-speech conversions to provide verbal communication to the game player over the voiced call and performs speech recognition and natural language understanding to receive verbal communication from the game player. Accordingly, the game player may carry on a natural language conversation with the voice services node 102. To perform these conversations, the voice services node 102 implements a platform such as the well-known voice extensible markup language ("VoiceXML") context which utilizes a VoiceXML interpreter function 104 of the voice services node in conjunction with VoiceXML documents. Another well-known platform that may be used is the speech application language tags ("SALT") platform. The interpreter 104 operates upon the VoiceXML or SALT documents to produce verbal communication of a conversation. The VoiceXML or SALT document provides the content to be spoken from the voice services node 102. The VoiceXML or SALT document is received by the VoiceXML or SALT interpreter function 104 through a data network connection of the communications network 100 in response to a voiced call being established with the game player at the voice services node 102. This data network connection as shown in the illustrative system of FIG. 1 includes a link through a firewall 106 to the Internet 108 and on through the firewall 132 to the intranet 130.

The verbal communication from the game player is received at the voice services node 102 and is converted into data representing each of the spoken words and their meanings through a conventional speech recognition function of the voice services node 102. The VoiceXML or SALT document that the VoiceXML or SALT interpreter function 104 is operating upon sets forth a timing of when verbal information that has been received and converted to data is packaged in a particular request back to the VoiceXML or SALT document application server 128 over the data network. This timing provided by the VoiceXML or SALT document allows the verbal responses of the customer to be matched with the verbal questions and responses of the VoiceXML or SALT document. Matching the communication of the customer to the communication from the voice services node enables an application server 128 of the intranet 130 to properly act upon the verbal communication from the game player. As shown, the application server 128 may interact with a voice services node through an intranet 130, through the Internet 108, or through a more direct network data connection as indicated by the dashed line.

The voice services node 102 may include additional functionality for the network-based gaming service so that multiple game players may participate in the same game. Multiple players way wish to participate in the same game over a single voiced call to the voice services node 102, such as by the multiple players communicating through a single speaker phone or through multiple handsets of the same telephone line. Some games may have a set sequence of when players respond so that there is no need to distinguish one voice from the next. However, other games may not have assigned periods such that any player can speak an instruction at any time, and in this case, each voice must be distinguished from the others. An explicit approach involves the player stating their name prior to saying their instruction.

To distinguish the voices over the same voiced call to the voice services node 102, the voice services node 102 may include a voice analysis application 138. The voice analysis application 138 employs a voice verification system such as the SpeechSecure™ application from SpeechWorks. Each player is prompted to register his or her voice with the voice analysis application 138 where the vocal pattern of the player is parameterized for later comparison. This voice registration may be saved as profile data in the database 124 for subsequent use. During the verbal exchanges of game play the various voice registrations that have been saved are compared with the received voice to determine which player is providing the instruction. The identity of the player providing the instruction is provided to the application server 128 so that the instruction can be applied to the game accordingly.

The multiple game players for the same game may choose to make separate calls to the voice services node 102, such as where each player is located separately from the others. In this situation, each caller can be distinguished based on the PSTN line that the instruction is provided over. For some multi-player games, it may not be necessary nor desirable for one player on one phone line to hear the instructions provided from the other game player, and since they are on separate calls to the voice services node 102, such isolation between callers is provided. However, the game may dictate or the players may desire that each player hear the instruction provided by the other players. To provide this capability, the voice services node 102 may provide a caller bridge 140 such as a conventional teleconferencing bridge so that the multiple calls may be bridged together and each caller or a designated caller such as a moderator can listen as appropriate to the verbal instructions of other callers during game play.

The application server 128 of the communications system 100 is a conventional computer server that implements an application program to control the automated and network-based gaming service for the game player. The application server 128 provides the VoiceXML or SALT documents to the voice services node 102 to bring about the conversation with the game player over the voiced call through the PSTN/cable network 110 and/or to the voice services node 136 to bring about the conversation with the game player over the VoIP Internet call. The application server 128 may additionally or alternatively provide files of pre-recorded verbal prompts to the voice services node where the file is implemented to produce verbal communication. The application server 128 may store the various pre-recorded prompts, grammars, and VoiceXML or SALT documents in a database 129. The application server also interacts with a customer profile database 124 that stores profile information for each game player, such as the particular preferences of the game player for various games to be played or a pre-registered voice pattern.

In addition to providing VoiceXML or SALT documents to the one or more voice services nodes of the communications system 100, the application server 128 may also serve hypertext markup language ("HTML"), wireless application protocol ("WAP"), or other distributed document formats depending upon the manner in which the application server has been accessed. For example, a game player may choose to send the application server profile information by accessing a web page provided by the application server to the personal computer 122 through HTML or to the wireless device 116 through WAP via a data connection between the wireless network 114 and the ISP 118. Such HTML or WAP pages may provide a template for entering information where the template asks a question and provides an entry field for the customer to enter the answer that will be stored in the profile database 124.

The profile database 124 may contain many categories of information for a game player. For example, the profile database 124 may contain preferences of the customer such as the particular settings for a game that the player prefers, such as a difficulty level. The profile database 124 may also store saved game progress so that the game player may start and stop game play without losing game progress. For certain games, the player may be required to purchase game time or be required to offer up a wager, and the profile database 124 may store credit account information for the player so that the costs associated with the games can be covered by the account.

As shown in FIG. 1, the profile database 124 may reside on the intranet 130 for the network-based gaming service. However, the profile database 124 may contain information that the game player considers to be sensitive, such as the credit account information. Accordingly, an alternative is to provide the customer profile database at the player's residence or place of business so that the player feels that the profile data is more secure and is within the control of the player. In this case, the application server 128 maintains an address of the customer profile database at the game player's local network rather than maintaining an address of the customer profile database 124 of the intranet 130 so that it can access the profile data as necessary.

For the personal data device 126 or personal computer 122 of FIG. 1, the network-based game may be implemented with these devices acting as a thin-game client. Accordingly, the player may access the network-based system through the personal data device 126 or personal computer 122 while the devices provide for the exchange of verbal communication with the game player and the game. Furthermore, these devices may perform as a thin-game client to render displays of the game on a display screen of these devices to give the game a visual component. Such display data may be provided to these devices over the data network from the application server 128. It is also reasonable to apply this network exchange of verbal communications to a traditional board game and its "tracking" of the automated game flow.

Also, for the personal data device 126 or personal computer 122 of FIG. 1, the game may be implemented locally with these devices acting as a thick-game client. Accordingly, the player accesses the game system directly on these devices and the game itself is implemented on these devices as opposed to being implemented on the application server 128 across the communications network 100. However, the verbal exchange may occur between these devices and the game player such that these devices are also thick-voice client, or the text to speech and speech recognition functions may be performed on the network such that these devices are also thin-voice clients.

Because the functions necessary for carrying on the game are integrated into the functionality of the personal data device 126 or personal computer 122 where the devices are both a thick-game and thick-voice device, network communications are not necessary for the games to proceed. However, these thick-game, thick-voice clients may receive updates to the game application data over the communications network 100 from the application server 128, and multi-player gaming requires a network connection where the multiple players are located remotely from one another. Updates may include new games to be played on the device or new levels added to an existing game. The updates may be automatically initiated by the devices periodically querying the application server 128 for updates or by the application server 128 periodically pushing updates to the devices or notification to a subscriber's email or other point of contact. Alternatively or consequently, the updates may be initiated by a selection from the game player at the device to be updated.

Figure 2:
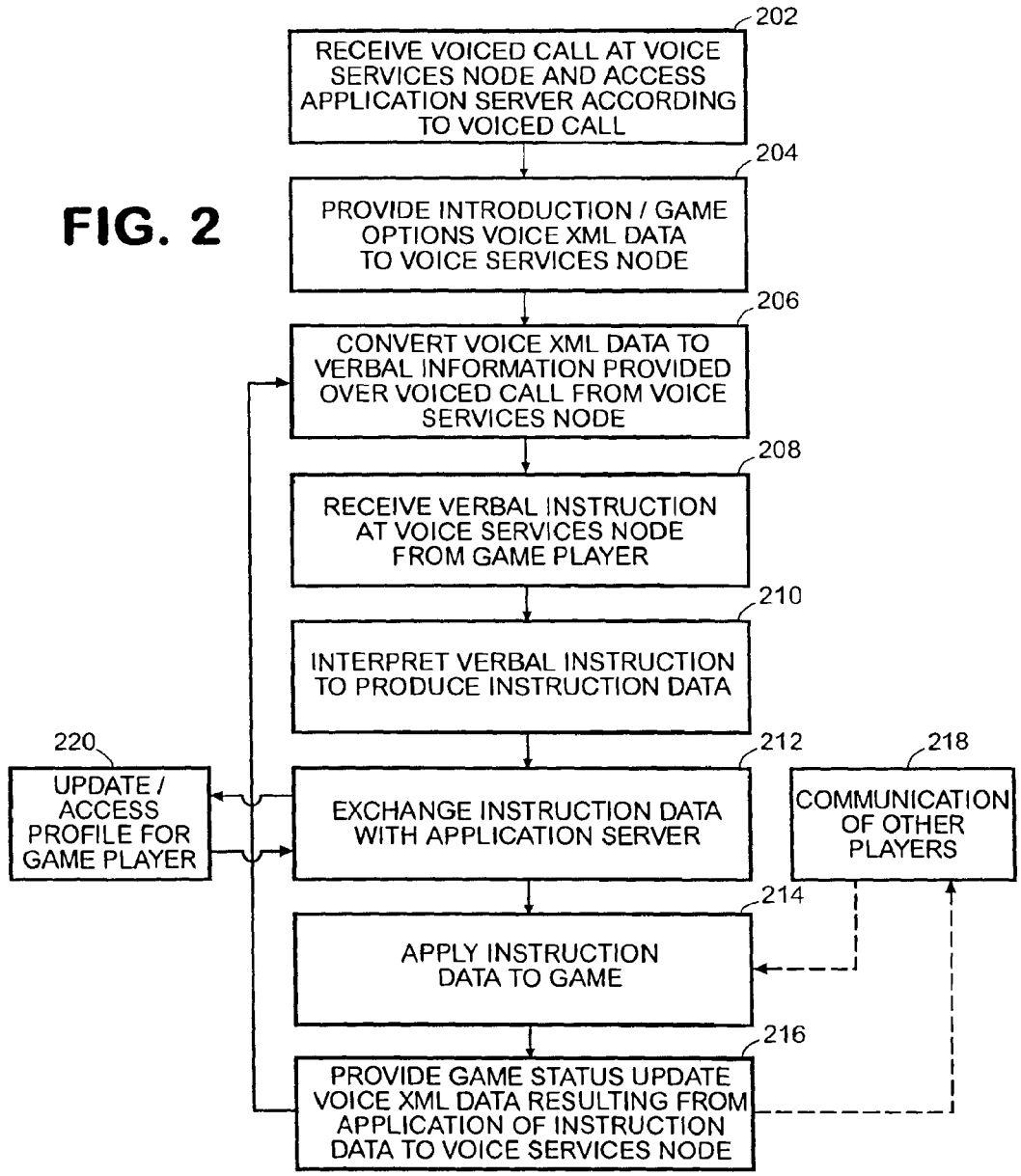
FIG. 2 illustrates one set of logical operations that may be performed within the system of FIG. 1 to provide the game for the game player utilizing a voice services node of a communications network.
Figure 3:
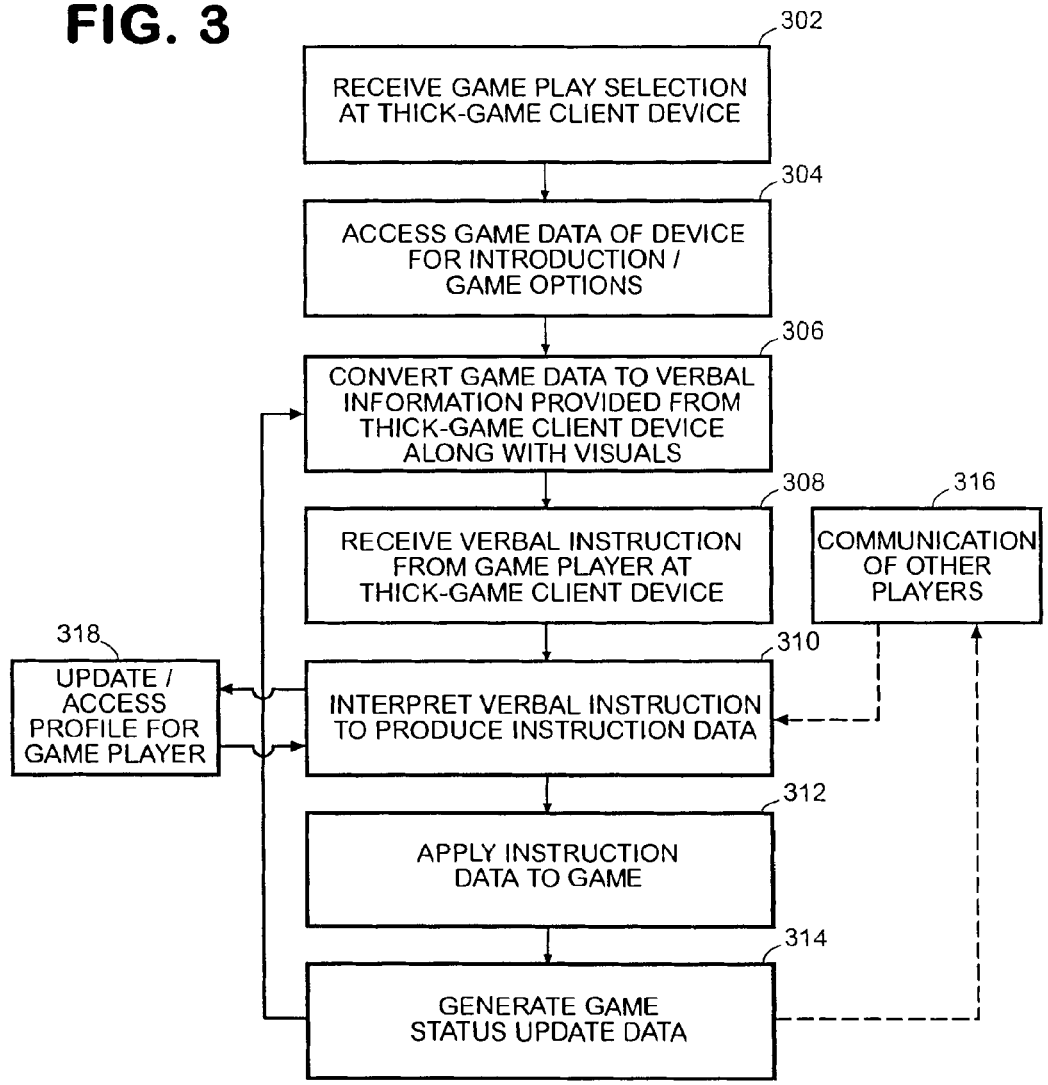
FIG. 3 illustrates one set of logical operations that may be performed within the system of FIG. 1 to provide the game for the game player utilizing a thick client device of the game player.
Figure 4:
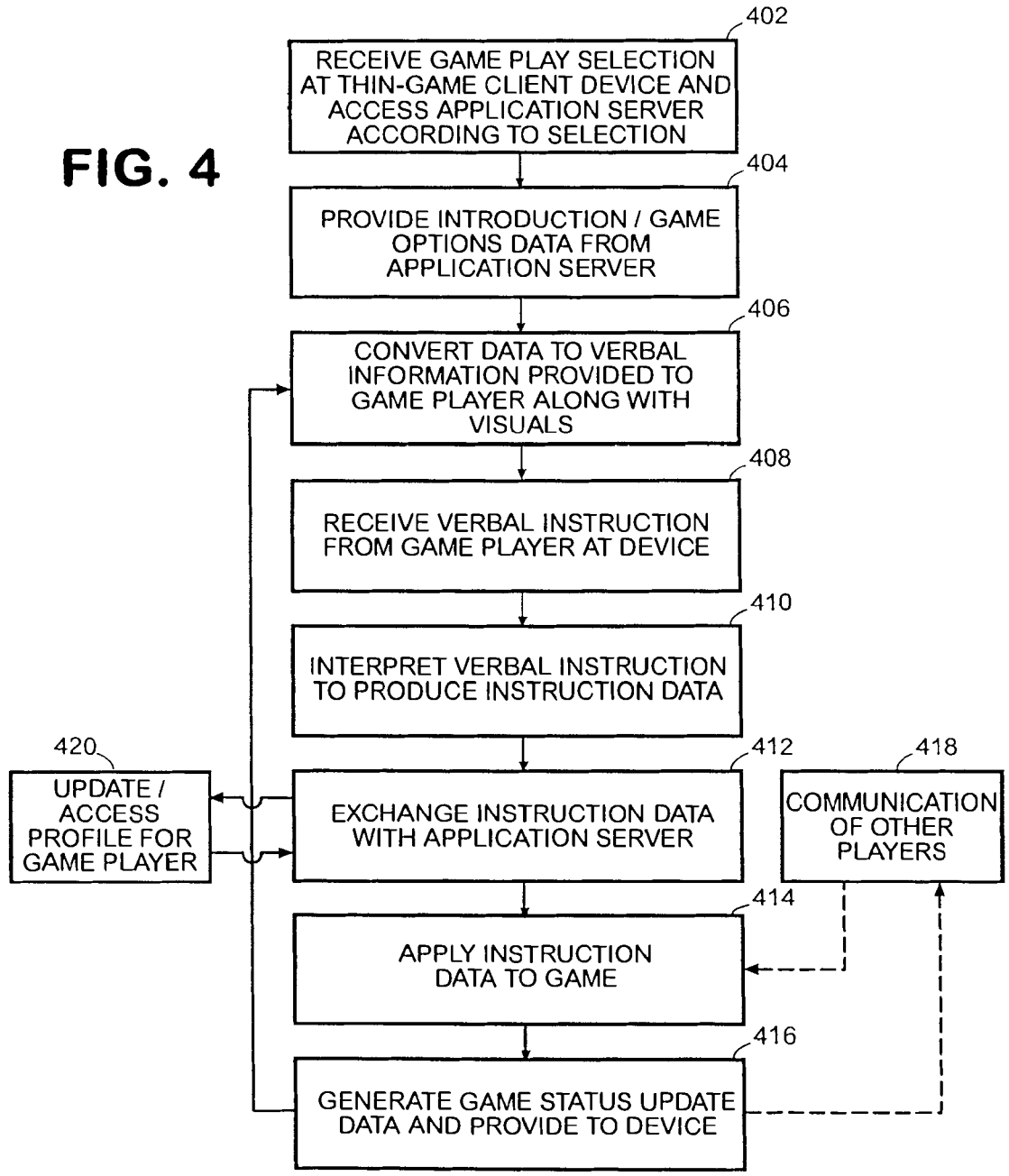
FIG. 4 illustrates one set of logical operations that may be performed within the system of FIG. 1 to provide the game for the game player utilizing a thin client connected to a communications network.

FIG. 2 illustrates one example of logical operations that may be performed within the communications system 100 of FIG. 1 to bring about the automated gaming where the game player makes a voiced call into the system. This set of logical operations, as well as those of FIGS. 3 and 4, are provided for purposes of illustration and are not intended to be limiting. For example, these logical operations of FIG. 2 discuss the application of VoiceXML within the communications system 100. However, it will be appreciated that alternative platforms for distributed text-to-speech and speech recognition may be used in place of VoiceXML, such as SALT discussed above or a proprietary less open method.

The logical operations begin at call operation 202 where the game player places a voiced call to a voice services node, directly or through a thin-voice client, or to a thick-voice client such as by dialing the number for the gaming service for the voice services node on the communications network or by selecting an icon on the personal computer where the voiced call is placed through the computer. The voice services node accesses the appropriate application server for the network-based game according to the voice call (i.e., according to the number dialed, icon selected, or other indicator provided by the customer). Utilizing the dialed number or other indicator of the voice call to distinguish one application server from another allows a single voice services node to accommodate multiple verbal communication services simultaneously. Providing a different identifier for each of the services or versions of a service offered through the voice services node or thick-voice client allows access to the proper application server for the incoming voiced calls. Additionally, the voice services node or thick-voice client may receive the caller identification information so that the profile for the player placing the call may be obtained from the database without requiring the player to verbally identify himself. Alternatively, the caller may be prompted to verbally identify himself so that the profile data can be accessed.

Upon the voice services node or thick-voice client accessing the application server, the application server provides introduction/options data through a VoiceXML document back to the voice services node at data operation 204. Upon receiving the VoiceXML document with the data, the voice services node or thick-voice client converts the VoiceXML data into verbal information that is provided to the game player at speech operation 206. This verbal information may provide further introduction and guidance to the player about using the system. This guidance may inform the player that he or she can barge in at any time with a question or with an instruction for a game. The guidance may also specifically ask that the player provide a verbal command, such as a request to start or join a particular game, a request to update the service or profile data, or a request to enroll in a game if multiple players are involved.

The voice services node or thick-voice client then receives verbal instructions from the game player at response operation 208. This verbal instruction may be a request to update the profile data, may be a request to start or join a game, or on subsequent iterations of this operation, may be an instruction relative to a game in progress. The voice services node or thick-voice client interprets the verbal instructions using speech recognition to produce data representing the words that were spoken at recognition operation 210. This data is representative of the words spoken by the player that are obtained within a window of time provided by the VoiceXML document for receiving verbal requests so that the application server can determine from keywords of the instruction data what the customer wants the service to do. The instruction data is transferred from the voice services node over the data network to the application server at exchange operation 212.

Upon receiving the instruction data, the application server may access the profile data for the player that may control aspects of how the player wants the game to be played at profile operation 220. For example, the profile data may specify the difficulty level or other game options that the player prefers. Additionally, the application server may access the profile data at profile operation 220 to update the data as instructed by the previously received verbal communication from the player. The application server then applies the instruction data to a game to start a new game, join an existing game, or perform an action within a game in progress for subsequent iterations of game operation 214.

The game that is being controlled at game operation 214 may be a multi-player game. Thus, when the application server is applying the instruction data received at exchange operation 212 to the game at game operation 214, then the application server is also applying instructions for the game received from other players of the same game at communication state 218. This communication state 218 graphically represents that the logical operations of FIG. 2 leading up to game operation 214 are also performed in parallel for the other game players who are also participating in the current common game.

After the application server applies the instruction data and respective individual game play for the one or more game players at game operation 214, the application server provides a game status update via data of a VoiceXML document provided to the voice services node or thick-voice client at status operation 216. Operational flow then returns to speech operation 206 where the voice services node or thick-voice client converts the VoiceXML data to verbal communication that is provided to the game player to inform him or her of the updated game status. For the other players of the game, if any, the VoiceXML data is also provided to the voice services node or thick-voice client they are in communication with to provide the update of the game status, as is indicated by the parallel return of the operational flow to communication state 218.

Through multiple iterations of these logical operations of FIG. 2, the automated game progresses utilizing the verbal communication between the game player(s) and the voice services node(s) until the game ends or the game player retires. As discussed above, the game player may choose to save the game to the customer profile when retiring so that the next time the player accesses the service, the player may instruct the service to continue the saved game.

FIG. 3 illustrates one example of logical operations that may be performed by a thick-game client device that is also a thick-voice client device, such as the personal data device 126 or personal computer 122 of FIG. 1 to bring about the automated gaming. This set of logical operations is provided for purposes of illustration and is not intended to be limiting.

The logical operations begin at selection operation 302 where the game player makes a gaming selection on the thick-game client device, such as by manually selecting a game from a menu. Alternatively, the selection may be made by the player verbally requesting the selection. The player may be prompted to verbally identify himself so that locally or remotely stored profile data can be accessed as necessary to facilitate the game play. The thick-game client then accesses the local game data according to the selection made by the game player at data operation 304.

Upon the thick-game client accessing the game data, the thick-game client may convert the data into verbal information using integrated text to speech functionality if also a thick-voice client, and the verbal information is directly provided to the game player at speech operation 306. This verbal information may provide further introduction and guidance to the player about using the gaming system of the thick-game client device. This guidance may inform the player that he or she can barge in at any time with a question or with an instruction for a game. The guidance may also specifically ask that the player provide a verbal command, such as a request to start or join a particular game, request to update the profile data, or request to enroll in a game if multiple players are involved. Where the thick-game client device is only a thin-voice client, then the device communicates with a voice services node to have the data converted into verbal information and provided back to the client device to output the speech.

The thick-game client then receives verbal instructions from the game player at response operation 308. This verbal instruction may be a request to update the profile data, may be a request to start a game, or on subsequent iterations of this operation, may be an instruction relative to a game in progress. The thick-game, thick-voice client or the voice services node in communication with the thick-game client interprets the verbal instructions using speech recognition to produce data representing the words that were spoken at recognition operation 310 and the integrated gaming application determines from keywords of the instruction data what the customer wants the gaming application to do.

The integrated gaming application may access the profile data for the player that may control aspects of how the player wants the game to be played at profile operation 318. For example, the profile data may specify the difficulty level or other game options that the player prefers. Additionally, the integrated gaming application may access the profile data at profile operation 318 to update the data as instructed by the previously received verbal communication from the player. The integrated gaming application then applies the instruction data to a game to start a new game or perform an action within a game in progress for subsequent iterations of game operation 312.

The game that is being controlled at game operation 312 may be a multi-player game. Thus, when the thick-game client is applying the instruction data of recognition operation 310 to the game at game operation 312, then the integrated gaming application is also applying instructions for the game received from other players of the same game at communication state 316. This communication state 316 graphically represents that the logical operations of FIG. 3 leading up to game operation 312 are also performed in parallel for the other game players who are also participating in the current game through the same thick-game client device or through another thick-game or thin-game client device that is in communication with the thick-game client device of the current player.

After the integrated gaming application applies the instruction data for the one or more game players at game operation 312, the integrated gaming application generates game status update data at status operation 314. Operational flow then returns to speech operation 306 where the integrated text to speech functionality of the thick-game client or the voice services node converts the update data to verbal communication that is provided to the game player to inform him or her of the updated game status. For the other players of the game, if any, the update data is also provided directly from the thick-game or thin-game client device they are in communication with to provide the update of the game status, as is indicated by the parallel return of the operational flow to communication state 316.

Through multiple iterations of these logical operations of FIG. 3, the automated game progresses utilizing the verbal communication between the game player(s) and the thick-game client device(s) until the game ends or the game player retires. As discussed above, the game player may choose to save the game to the customer profile when retiring so that the next time the player accesses the integrated gaming application, the player may instruct the service to continue the saved game.

For the thick-game client device embodiment, the game data may be periodically updated or updated at the request of the game player. The update occurs by the thick-game client device accessing over the communications network the application server to receive the new game data. Accordingly, the games provided by the thick-game client device may be updated to prevent the games from becoming stale or outdated to the game player.

FIG. 4 illustrates one example of logical operations that may be performed within the communications system 100 of FIG. 1 to bring about the automated gaming where the game player operates a thin-game client that logs into the system. This set of logical operations is provided for purposes of illustration and is not intended to be limiting. For example, these logical operations of FIG. 4 discuss the application of DSR within the communications system 100 where the thin-game client is also a thin-voice client. However, it will be appreciated that alternative platforms for distributed text-to-speech and speech recognition may be used in place of DSR for thin-voice clients and that the thin-game client may not necessarily be a thin-voice client.

The logical operations begin at selection operation 402 where the game player makes a gaming selection on the thin-game client device, such as by manually selecting a game service option from a menu. Alternatively, the selection may be made by the player verbally requesting the game service selection. The player may be prompted to verbally identify himself so that remotely stored profile data can be accessed as necessary to facilitate the game play. The thin-game client then accesses the application server according to game service selected by the game player.

Upon the thin-game client accessing the application server, the application server provides introduction/options data to the voice services node at data operation 404 where the thin-game client is a thin-voice client or provides the data directly to the thin-game client which is a thick-voice client. Upon receiving the speech data, the voice services node or thin-game, thick-voice client converts the data into verbal information that is provided directly to the game player at speech operation 406. This verbal information may provide further introduction and guidance to the player about using the system. This guidance may inform the player that he or she can barge in at any time with a question or with an instruction for a game. The guidance may also specifically ask that the player provide a verbal command, such as a request to start or join a particular game or a request to update the profile data.

The thin-game client device then receives verbal instructions from the game player at response operation 408. This verbal instruction may be a request to update the profile data, may be a request to start or join a game, or on subsequent iterations of this operation, may be an instruction relative to a game in progress. The thin-game client that is also a thin-voice client interprets the verbal instructions using DSR speech recognition to produce DSR parameterization data representing the words that were spoken at recognition operation 410. The DSR parameterization data is transferred from the thin-game, thin-voice client over the data network to the voice services node where the DSR exchange function translates the DSR parameterization data into conventional textual instruction data representative of the spoken words and provided to the application server at exchange operation 412. For the thin-game client embodiment that is also a thick-voice client, the thin-game client converts the verbal instructions directly to data that is then provided over the communications network to the application server.

Upon receiving the instruction data, the application server may access the profile data for the player that may control how aspects of how the player wants the game to be played at profile operation 420. For example, the profile data may specify the difficulty level or other game options that the player prefers. Additionally, the application server may access the profile data at profile operation 420 to update the data as instructed by the previously received verbal communication from the player. The application server then applies the instruction data to a game to start a new game, join an existing game, or perform an action within a game in progress for subsequent iterations of game operation 414.

The game that is being controlled at game operation 414 may be a multi-player game. Thus, when the application server is applying the instruction data received at exchange operation 412 to the game at game operation 414, then the application server is also applying instructions for the game received from other players of the same game at communication state 418. This communication state 418 graphically represents that the logical operations of FIG. 4 leading up to game operation 414 are also performed in parallel for the other game players who are also participating in the current game.

After the application server applies the instruction data for the one or more game players at game operation 414, the application server provides a game status update via textual data to the voice services node or thin-game, thick-voice client at status operation 416. Operational flow then returns to speech operation 406 where the thin-game, thick-voice client converts the data to verbal communication or the thin-game, thin-voice client produces verbal information received from the voice services node. The verbal communication is provided to the game player to inform him or her of the updated game status. For the other players of the game, if any, the data is also provided to the thin-game, thick-voice client or voice services node that they are in communication with to provide the update of the game status, as is indicated by the parallel return of the operational flow to communication state 418.

Through multiple iterations of these logical operations of FIG. 4, the automated game progresses utilizing the verbal communication between the game player(s) and the thin-game client(s) until the game ends or the game player retires. As discussed above, the game player may choose to save the game to the customer profile when retiring so that the next time the player accesses the service, the player may instruct the service to continue the saved game.

As has been described above, an automated system provides game players with the ability to verbally communicate to participate in gaming. The gaming may be educational based games such as mathematical games, may be based off of well-known television game shows, and may be based on board games where the player may utilize the tangible board for a game while participating in or complementing the game through the automated system. Because the inputs and outputs of the game are verbal communications, the game may be played through a telephone or thin-game client for a network based implementation or through a thick-game client for integrated implementations.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   prompting, through a communication network, a first game player to provide a voice pattern for registration;
   receiving the voice pattern from the first game player;
   registering the first game player as an active player based on the voice pattern;
   when the first game player is registered, allowing the first game player to participate in game play; and
   during participation of the first game player in game play:
      receiving verbal game commands from the first game player and a second game player;
      identifying, via a processor, by comparing the voice pattern to a second game player voice pattern associated with the second game player, an instruction from the first game player within the verbal game commands; and responsive to the instruction, following a predefined set of logical operations comprising:
         applying, via the processor, the instruction within the game play, to yield updated game play;
         providing a spoken notice to the first game player and the second game player regarding the updated game play; and
         bridging the verbal game commands of the first game player and the second game player in the communication network so that the first game player can hear the second game player but the second game player cannot hear the first game player, while the first game player is providing the verbal game commands.

2. The method of claim 1, wherein the first game player and the second game player communicate via respective personal devices, the method further comprising periodically accessing a computer-implemented application over the communications network to update game data of the respective personal devices.

3. The method of claim 1, further comprising:
   receiving information data from a computer-implemented application associated with the first game player; and
   prior to applying of the instruction within the game play, interpreting the instruction from the first game player using the information data, to produce instruction data.

4. The method of claim 3, further comprising:
   providing verbal information associated with a current game status of the game play to the first game player through the communication network; and
   matching a timing of the instruction data and the verbal game commands of the game player with the verbal information provided to the first game player.

5. A system comprising:
   a processor; and
   a computer-readable storage medium having instructions stored which, when executed by the processor, result in the processor performing operations comprising:
   prompting, through a communication network, a first game player to provide a voice pattern for registration;
   receiving the voice pattern from the first game player;
   registering the first game player as an active player based on the voice pattern;
   when the first game player is registered, allowing the first game player to participate in game play; and
   during participation of the first game player in game play:
      receiving verbal game commands from the first game player and a second game player;
      identifying, by comparing the voice pattern to a second game player voice pattern associated with the second game player, an instruction from the first game player within the verbal game commands; and
      responsive to the instruction, following a predefined set of logical operations comprising:
         applying, via the processor, the instruction within the game play, to yield updated game play;
         providing a spoken notice to the first game player and the second game player regarding the updated game play; and
         bridging the verbal game commands of the first game player and the second game player in the communication network so that the first game player can hear the second game player but the second game player cannot hear the first game player, while the first game player is providing the verbal game commands.

6. The system of claim 5, the computer-readable storage medium having additional instructions stored which result in the operations further comprising:
   receiving instruction data from an application associated with the first game player; and
   using the instruction data when applying the instruction within the game play to update a current game status, wherein the information data comprises data specifying the update to the current game status.

7. The system of claim 5, further comprising a profile database containing profile data for the first game player, wherein registration of the first game player further comprises performing a comparison of the voice pattern to the profile data of the first game player in the profile database, and wherein the game play for the first game player is adjusted based on the profile data.

8. The system of claim 5, wherein the instruction from the first game player comprises profile information for configuring a game being played.

9. The system of claim 5, the computer-readable storage medium having additional instructions stored which result in the operations further comprising providing a current game status to the first game player through the communications network.

10. The system of claim 5, the computer-readable storage medium having additional instructions stored which result in the operations further comprising providing visual information to a display device of the first game player.

11. A non-transitory computer-readable storage device having instructions stored which, when executed by a computing device, cause the computing device to perform operations comprising:
   prompting, through a communication network, a first game player to provide a voice pattern for registration;
   receiving the voice pattern from the first game player;
   registering the first game player as an active player based on the voice pattern;
   when the first game player is registered, allowing the first game player to participate in game play; and
   during participation of the first game player in game play:

receiving verbal game commands from the first game player and a second game player;

identifying, via a processor, by comparing the voice pattern to a second game player voice pattern associated with the second game player, an instruction from the first game player within the verbal game commands; and responsive to the instruction, following a predefined set of logical operations comprising:

applying, via the processor, the instruction within the game play, to yield updated game play;

providing a spoken notice to the first game player and the second game player regarding the updated game play; and bridging the verbal game commands of the first game player and the second game player in the communication network so that the first game player can hear the second game player but the second game player cannot hear the first game player, while the first game player is providing the verbal game commands.

\* \* \* \* \*